G. ERDBRUEGGER.
METHOD OF PRODUCING SCULPTURES.
APPLICATION FILED JUNE 7, 1910.

972,174.

Patented Oct. 11, 1910.

Witnesses:
Harry E. Herbig
R. Brockman

Inventor
Gustav Erdbruegger
By his Attorney
Max D. Ordman

UNITED STATES PATENT OFFICE.

GUSTAV ERDBRUEGGER, OF ANDERTEN, GERMANY, ASSIGNOR TO RELIEFOGRAPH COMPANY, A CORPORATION OF NEW YORK.

METHOD OF PRODUCING SCULPTURES.

972,174.   Specification of Letters Patent.   Patented Oct. 11, 1910.

Original application filed March 8, 1910, Serial No. 548,083. Divided and this application filed June 7, 1910. Serial No. 565,604.

*To all whom it may concern:*

Be it known that I, GUSTAV ERDBRUEGGER, a subject of the German Emperor, residing at Anderten, in the Province of Hanover, in Germany, have invented certain new and useful Improvements in Methods of Producing Sculptures, of which the following is a specification.

The present invention pertains to a method of producing positive and negative sculptures from photographs, designs, engravings or pictures of any kind, and is a division from the application, Ser. #548,083, filed March 8, 1910.

The object of my invention is to provide a method of producing sculptures from photographs, etc., that will not only assist the artist, but enable even laymen to produce sculptures of artistic finish, speedily and cheaply, and will also serve as a means of instruction. Owing to the simplicity of the method, the same may be utilized in various branches of industry, as for instance, metal, porcelain, glass, stoneware, stucco, wall paper, celluloid, chocolate, etc.

Reference is had to the accompanying drawing, in which similar reference letters denote corresponding parts and in which—

Figure 1:
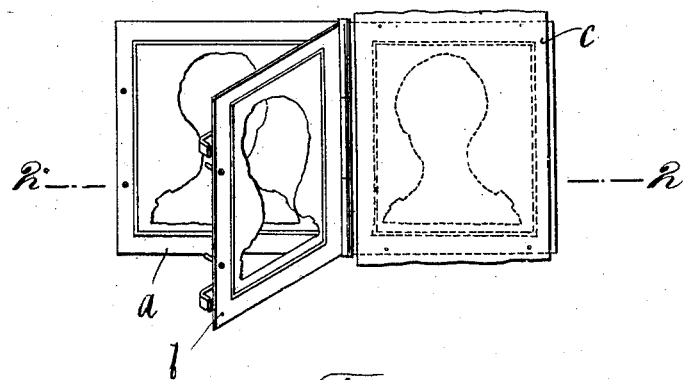
Figure 2:
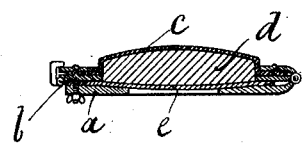
Figure 3:
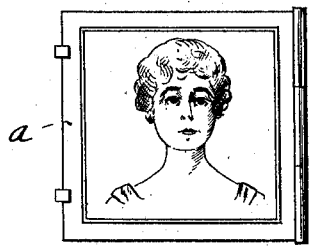

Figure 1 shows a plurality of stencils and the elastic base in perspective view; Fig. 2 a cross section on line 2—2 of Fig. 1 and Fig. 3 a front view of the finished sculpture.

My method consists in that a picture *e*, photograph, design, engraving, etc., made on flexible material, as, for instance, paper, linen or the like, is suitably fastened between two stencils *a*, *b* of non-flexible material, which stencils are previously prepared, so that their cut out portions register with one another and with a portion of the picture, etc., which is to appear in relief. The thus mounted photograph, etc., is placed face upward over a base *c* of elastic material, as, for instance, a rubber sheet and is suitably fixed in position relative thereto. The picture is then impregnated or dampened with a suitable substance as glycerin, or the like, to make it more flexible and to allow of it being pressed through the stencils. Then a mass *d* of suitable plastic material, as clay, or the like, which is easily moldable and at the same time rapidly stiffens, is placed between the elastic base and the thus prepared and mounted photograph, etc., so that the material will cause the dampened part of the portrait or design to protrude forward through the stencils. I have found the following composition to give the most advantageous results: A suitable quantity of pounce, mixed with pulverized blue slate earth, pulverized clay, pulverized hemp, in luke warm water and dissolved lime. According to his artistic taste and following the shade lines on the picture, the manipulator then works with his fingers on the elastic base and presses the plastic material so as to bring forward parts of the face, figure, costume, etc., more or less prominently, as may be required. From above, on the other hand, the detailed molding of the various minuter parts may be accomplished by a proper instrument.

What I claim and desire to secure by Letters Patent is:

The herein described method, consisting in first preparing a system of masks or stencils of the picture, design, etc., fixing the picture between said stencils, impregnating or dampening the picture with a fluid capable of rendering it more flexible or elastic, then placing a plastic mass between the thus mounted picture and an elastic base, and treating the said mass by pressing against the said elastic base.

In testimony whereof I affix my signature in presence of two witnesses.

GUSTAV ERDBRUEGGER.

Witnesses:
J. M. BOWCOCK,
M. BEHNE.